United States Patent
Lopez Galera et al.

(10) Patent No.: US 10,144,395 B2
(45) Date of Patent: Dec. 4, 2018

(54) CLEANING DEVICE AND SYSTEM FOR VEHICLE-MOUNTED OPTIC SURFACE AND VEHICLE-MOUNTED OPTIC SENSOR WITH CLEANING DEVICE

(71) Applicant: Fico Transpar, S.A., Barcelona (ES)

(72) Inventors: Robert Lopez Galera, Barcelona (ES); Carlos Esteller Pitarch, Barcelona (ES); Miguel Mota Lopez, Barcelona (ES)

(73) Assignee: Fico Transpar, S.A., Barcelona (ES)

( * ) Notice: Subject to any disclaimer, the term of this patent is extended or adjusted under 35 U.S.C. 154(b) by 234 days.

(21) Appl. No.: 14/717,264

(22) Filed: May 20, 2015

(65) Prior Publication Data

US 2015/0344001 A1 Dec. 3, 2015

(30) Foreign Application Priority Data

May 27, 2014 (EP) ..................................... 14382193

(51) Int. Cl.
*B60S 1/56* (2006.01)
*B60S 1/52* (2006.01)
(Continued)

(52) U.S. Cl.
CPC ............... *B60S 1/56* (2013.01); *B60S 1/0848* (2013.01); *B60S 1/52* (2013.01); *B60S 1/528* (2013.01); *B60S 3/04* (2013.01)

(58) Field of Classification Search
CPC .......... B60S 1/0848; B60S 1/528; B60S 1/52; B60S 1/56; B60S 1/603; B60S 3/04; G01N 21/115; G01N 2021/151; G02B 27/0006

See application file for complete search history.

(56) References Cited

U.S. PATENT DOCUMENTS 3,058,142 A * 10/1962 Pollock ................... B60S 1/606
15/250.002
3,469,088 A * 9/1969 Coleman ................... B60S 1/60
134/123
3,609,450 A * 9/1971 Hart ......................... B60S 1/603
239/284.2

(Continued)

FOREIGN PATENT DOCUMENTS

CN 201923085 U * 8/2011 ................ B60S 1/56
DE 102013213415 A1 * 1/2015 ............ B60S 1/0848
(Continued)

OTHER PUBLICATIONS

English Machine Translation of Description of CN 201923085 U (Liang, Aug. 2011).*

(Continued)

*Primary Examiner* — Joseph L. Perrin
*Assistant Examiner* — Irina Graf
(74) *Attorney, Agent, or Firm* — Oblon, McClelland, Maier & Neustadt, L.L.P.

(57) ABSTRACT

A cleaning device for cleaning a vehicle-mounted optic surface, including a housing, the housing including an opening adapted to fit an optic surface, a fluid inlet arranged to take in washer fluid, an at least one fluid discharge port arranged to discharge washer fluid onto the optic surface, a first passage in fluidic communication with the fluid inlet and the at least one fluid discharge port so as to guide the washer fluid from the fluid inlet towards the at least one fluid discharge port and a protruding part that substantially surrounds the opening so as to define an inner wall. A cleaning system and a vehicle-mounted sensor can include an optic surface and the cleaning device.

17 Claims, 3 Drawing Sheets

(51) Int. Cl.
    *B60S 3/00*    (2006.01)
    *B60S 3/04*    (2006.01)
    *B60S 1/08*    (2006.01)

(56) References Cited

U.S. PATENT DOCUMENTS

| | | | |
|---|---|---|---|
| 6,905,078 B1 | 6/2005 | Gattuso et al. | |
| 8,596,798 B1* | 12/2013 | VanOsdol | F22B 37/38 359/509 |
| 9,783,167 B2* | 10/2017 | Niemczyk | B60S 1/528 |
| 2011/0073142 A1* | 3/2011 | Hattori | B60S 1/0848 134/56 R |
| 2011/0277263 A1* | 11/2011 | Guo | B05B 1/20 15/250.002 |
| 2014/0060582 A1 | 3/2014 | Hartranft et al. | |
| 2017/0259789 A1* | 9/2017 | McAndrew | B60S 1/528 |

FOREIGN PATENT DOCUMENTS

| | | |
|---|---|---|
| EP | 1 726 498 A1 | 11/2006 |
| FR | 2 681 031 A1 | 3/1993 |
| JP | 2013-6481 | 1/2013 |
| WO | WO 00/51745 | 9/2000 |

OTHER PUBLICATIONS

English Machine Translation of Description of FR 2681031 A1 (Christian, Dec. 1993).*
English Machine Translation of Description of DE 102013213415 A1 (Fey, Jan. 2015).*
European Search Report dated Nov. 11, 2014 in European Application 14382193, filed on May 27, 2014 ( with Written Opinion).

* cited by examiner

CLEANING DEVICE AND SYSTEM FOR VEHICLE-MOUNTED OPTIC SURFACE AND VEHICLE-MOUNTED OPTIC SENSOR WITH CLEANING DEVICE

The present disclosure relates to cleaning devices and cleaning systems for vehicle-mounted optic surfaces as well as vehicle-mounted optic sensors with cleaning devices.

BACKGROUND

At present, motor vehicles are commonly fitted with optic sensors to assist drivers in diverse traffic situations, such as, but not limited to, parking assistance, blind zone object detection, traffic lane departure, traffic signal identification or rear view mirror substitution.

Generally, these optic sensors are fitted on a vehicle's exterior surface such that an optic surface, such as a lens surface or a cover window disposed afore the lens surface, is exposed to foreign matter such as insects, raindrops, mud or dust. Hence, there is a need to remove foreign matter adhered onto the optic surface of a vehicle-mounted optic sensor.

It is well-known in the art to provide a cleaning device for cleaning an optic surface of an optic sensor having a nozzle arranged to discharge washer fluid onto the optic surface. The discharged washer fluid impinges onto the optic surface from where it bounces off and spatters to the ground containing removed foreign matter. However, these solutions waste large quantities of washer fluid.

In JP2013006481 a vehicle-mounted camera washer nozzle is provided for cleaning an imaging surface. The washer nozzle discharges washer fluid onto a downward tilting surface where it impinges and dribbles towards the imaging surface.

This prior art solution is inefficient against strongly adhered foreign matter, such as dried mud or insects, as the impact energy of the impinging washer fluid is wasted onto a surface other than the surface to be cleaned.

SUMMARY

Therefore, it is an object of the invention to provide a cleaning device for a vehicle-mounted optic surface which efficiently removes foreign matter adhered onto the optic surface with reduced washer fluid consumption.

According to a first aspect of the invention, a cleaning device for cleaning a vehicle-mounted optic surface is provided. The cleaning device comprises a housing having at least an opening adapted to fit an optic surface, a fluid inlet arranged to take in washer fluid, an at least one fluid discharge port arranged to discharge washer fluid onto the optic surface, a first passage in fluidic communication with the fluid inlet and the at least one fluid discharge port so as to guide the washer fluid from the fluid inlet towards the at least one fluid discharge port and a protruding part that surrounds the opening so as to define an inner wall around the opening.

The technical effect and advantage derived from the above-described configuration is that washer fluid which has bounced off from the optic surface instead of spattering to the ground, bounces off the inner wall of the protruding part and returns to the optic surface. The inner wall further contributes to retain a quantity of washer fluid in contact with at least a portion of the optic surface.

Therefore, the impingent washer fluid removes adhered foreign matter due to its direct impact onto the optic surface and contributes to create a turbulent flow in the retained washer fluid, further removing adhered foreign matter.

In view of the above, this configuration allows washer fluid consumption to be reduced so as to obtain the same cleaning efficiency as other known prior art solutions.

An at least one opening may be provided in the protruding part such that the inner wall is at least partially interrupted thereat and, for instance, washer fluid can leak therethrough. However, this at least one opening could be configured such that the at least partially interrupted inner wall retains a quantity of washer fluid in contact with at least a portion of the optic surface during washer fluid discharge through the at least one fluid discharge port.

It is preferred that the at least one fluid discharge port is provided in the inner wall of the protruding wall as discharge of the washer fluid onto the optic surface is eased.

In an embodiment of the invention, the protruding part is rotatable around the opening. In a first possible configuration of this embodiment, the first passage is adapted to cooperate with the washer fluid to rotate the protruding part around the opening.

In a second possible configuration of this embodiment, a plurality of blades is provided in the protruding part such that the plurality of blades is arranged to cooperate with the washer fluid to rotate the protruding part around the opening.

In a third possible configuration, a plurality of blades is provided in the first passage such that the plurality of blades is arranged to cooperate with the washer fluid to rotate the protruding part around the opening.

Rotation of the protruding part around the opening increases cleaning efficiency as both the washer fluid retained within the inner wall and the washer fluid bouncing off the inner wall after having bounced off the optic surface are energized by this rotation.

In this embodiment it is preferred that the at least one fluid discharge port is provided in the inner wall of the protruding wall as this allows the at least one fluid discharge port to cover a greater impact region on the optic surface and also contributes to increase turbulence around the impact region. This further increases cleaning efficiency and is especially suitable against strongly adhered foreign matter such as dried mud or insects.

In this same embodiment, optionally, a stopper mean configured to limit rotation of the protruding part around the opening to a predefined angle around the opening is provided.

This configuration allows a two-phase cleaning, a first phase where washer fluid discharge is combined with rotation of the protruding part to remove strongly adhered foreign matter and a second phase where only washer fluid is discharged to wash away the removed foreign matter.

Also optionally in this same embodiment, the first passage is provided in the protruding part and a second passage is provided in the housing, the second passage being in fluidic communication with the fluid inlet and the first passage so as to guide washer fluid therethrough. The second passage is adapted to guide the rotary movement of the protruding part. This configuration allows for size reduction of the cleaning device.

In another embodiment of the invention, the protruding part is configured to move from an extended position to a retracted position, such that in the retracted position the protruding part is hidden inside the housing. In other words, the protruding part is movable from a retracted position where the protruding part does not define an inner wall substantially surrounding the opening and an extended position where the protruding part defines an inner wall substantially surrounding the opening.

An advantage of this embodiment is that the optic sensor's field of vision is not disturbed by the protruding part when the cleaning device is in a non-operative state. These field of vision perturbations are especially relevant when the optic sensor is an imaging device, such as a wide range vehicle-mounted camera, where part of the image would have to be cropped to eliminate the protruding part.

In this embodiment, optionally a biasing mean configured to bias the protruding part towards the retracted position is provided. The biasing mean is arranged such that it prevents movement of the protruding part from the retracted position to the extended position until the pressure of the washer fluid within the first passage surpasses a predefined threshold level. As a result, recovery of the retracted position is facilitated.

In a preferred embodiment of the biasing mean, the biasing mean comprises a spring having a first end in abutment with a portion of the protruding part and a second end in abutment with an abutment portion of the housing.

The abutment portion of the housing may be an abutment mean integrally formed with the housing, fixedly coupled to the housing or detachably coupled to the housing by any known means. Preferably, the abutment mean is snap-fitted to the housing.

In this same embodiment, optionally, the first passage is provided in the protruding part and a second passage is provided in the housing, the second passage being in fluidic communication with the fluid inlet and the first passage so as to guide washer fluid therethrough. The second passage is adapted to guide the movement of the protruding part between the retracted position and the extended position. This configuration allows for size reduction of the cleaning device.

In another possible embodiment of the invention, the housing further comprises an attachment mean adapted to detachably attach the cleaning device to an optic surface. Preferably, the attachment mean is a snap-fitting mean adapted to snap-fit the cleaning device to a housing of an optic sensor having an optic surface.

An advantage of this embodiment is that it makes the design flexible to optic sensor housing variations and makes possible substitution of the cleaning device without damaging the optic sensor housing.

In still another embodiment of the invention, the protruding part is rotatable around the opening and configured to move from an extended position to a retracted position, such that in the retracted position the protruding part is hidden inside the housing. The first passage is adapted to cooperate with the washer fluid to rotate the protruding part around the opening.

This configuration is further advantageous as it combines the advantages of the protruding part being rotatable and the protruding part being concealable within the housing.

Preferably, a guiding mean arranged to guide simultaneous displacement and rotation of the protruding part is provided. In a first possible configuration of this embodiment, a helical slot is provided in the housing and a helical protrusion is provided in the protruding part. The helical slot and the helical protrusion are adapted to cooperate with each other so as to guide simultaneous displacement and rotation of the protruding part. Alternatively, the helical slot is provided in the protruding part and the helical protrusion is provided in the housing.

In a second possible configuration of this embodiment, a first helical protrusion is provided in the housing and a second helical protrusion is provided in the protruding part. The first and second helical protrusions are adapted to cooperate with each other so as to guide simultaneous displacement and rotation of the protruding part.

According to a second aspect of the invention, a cleaning system for a vehicle-mounted optic surface is provided. The cleaning system comprises a washer fluid feeding mean to supply washer fluid to a fluid inlet of a cleaning device for cleaning an optic surface. The washer fluid feeding mean comprises a washer fluid reservoir, a pump and washer fluid conduits connecting the washer fluid reservoir, the pump and the cleaning device therebetween.

According to a third aspect of the invention, a vehicle-mounted optic sensor is provided. The optic sensor comprises an optic surface and a housing adapted to be fitted to an exterior surface of a vehicle. A cleaning device is fitted to the optic sensor housing for cleaning the optic surface.

Optionally, the cleaning device is integrally formed with a portion of the housing of the optic sensor.

In the present description the term optic surface refers to any type of surface which assists or merely allows an optic device to capture an image. More specifically, an optic surface is an optic lens or a cover window placed to protect an optic lens or to protect an optic sensor.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
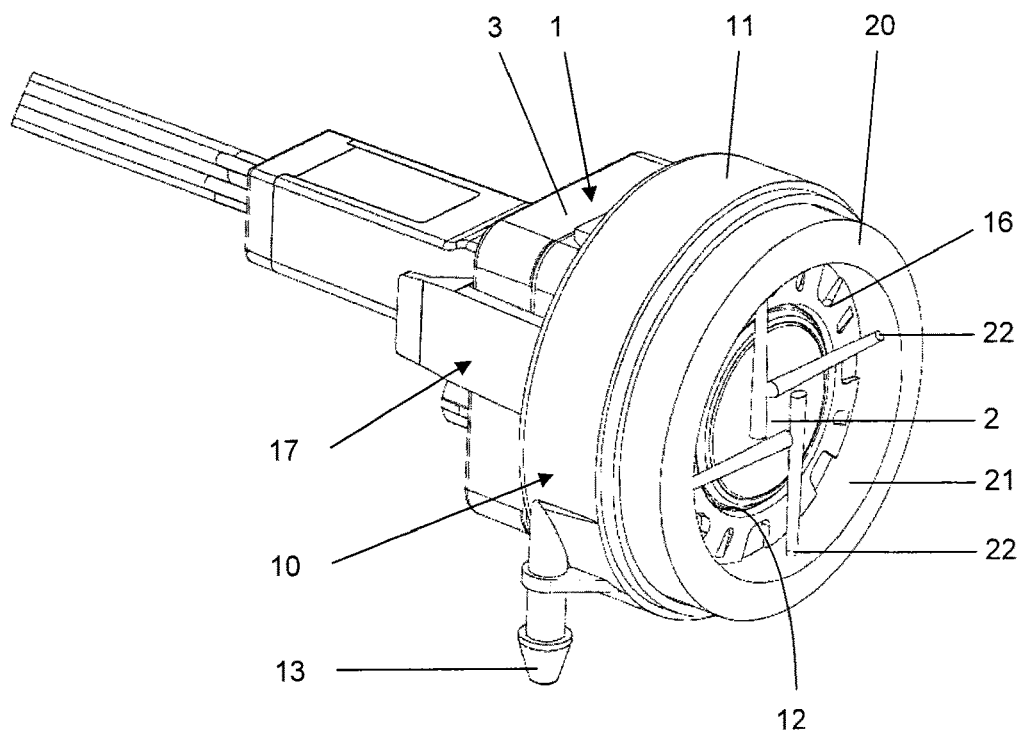
FIGS. 1 and 2 show an isometric view of a preferred embodiment of a cleaning device fitted to an optic sensor in the operative state and the non-operative state, respectively.

FIG. 1 shows an optic sensor 1 with a cleaning device 10 suitable to be fitted in a vehicle exterior surface. The cleaning device 10 is preferably made of plastic material and is configured to clean an optic surface 2 of the optic sensor 1 by discharging washer fluid onto the optic surface 2.

An optic sensor housing 3 and a housing 11 of the cleaning device 10 are fitted together such that the optic surface 2 is mounted at an opening 12 of the cleaning device's housing 11.

This opening 12 is surrounded by a protruding part 20 provided in the housing 11 such that the protruding part 20 defines an inner wall 21 around the opening 12. An at least one fluid discharge port 22 is provided in the housing 11, preferably in the inner wall 21 of the protruding part 20, and arranged to discharge washer fluid onto the optic surface 2 in an operative state of the cleaning device 10. In this example, four fluid discharge ports 22 are provided in the inner wall 21.

Figure 2:
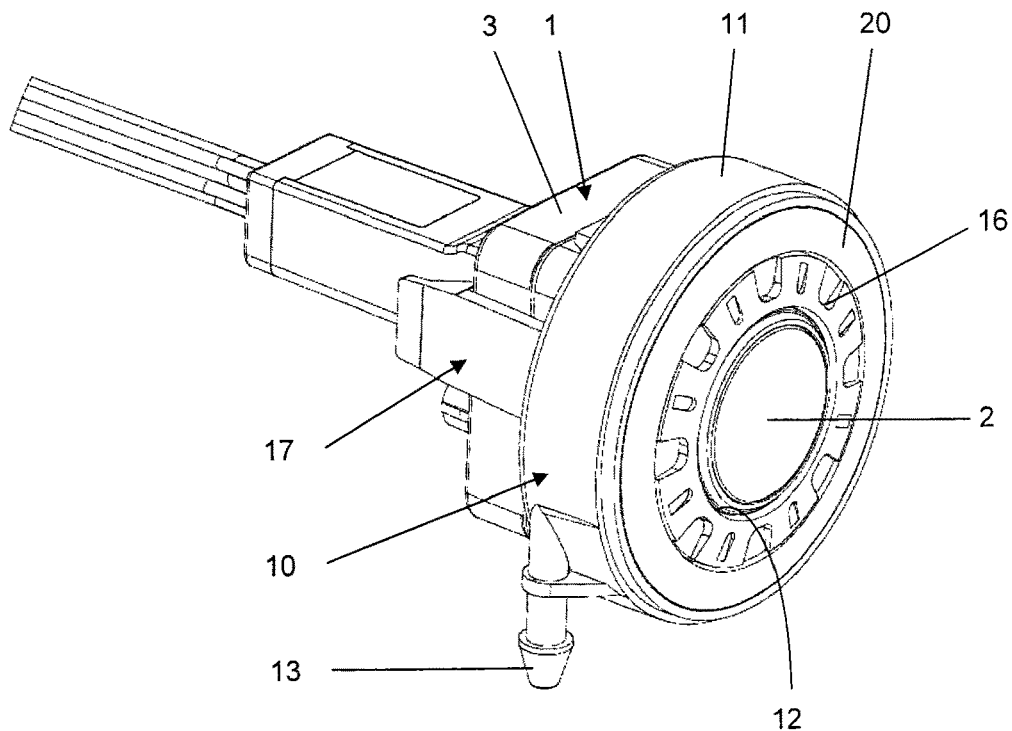

In this preferred embodiment of the invention, the protruding part 20 is rotatable around the opening 12 and movable between an extended position (FIGS. 1 and 3) and a retracted position (FIGS. 2 and 4), such that in the retracted position the protruding part 20 is hidden inside the housing 11 as can be appreciated in FIG. 2. Therefore, the protruding part 20 is not fixedly coupled to the housing 11.

Figure 3:
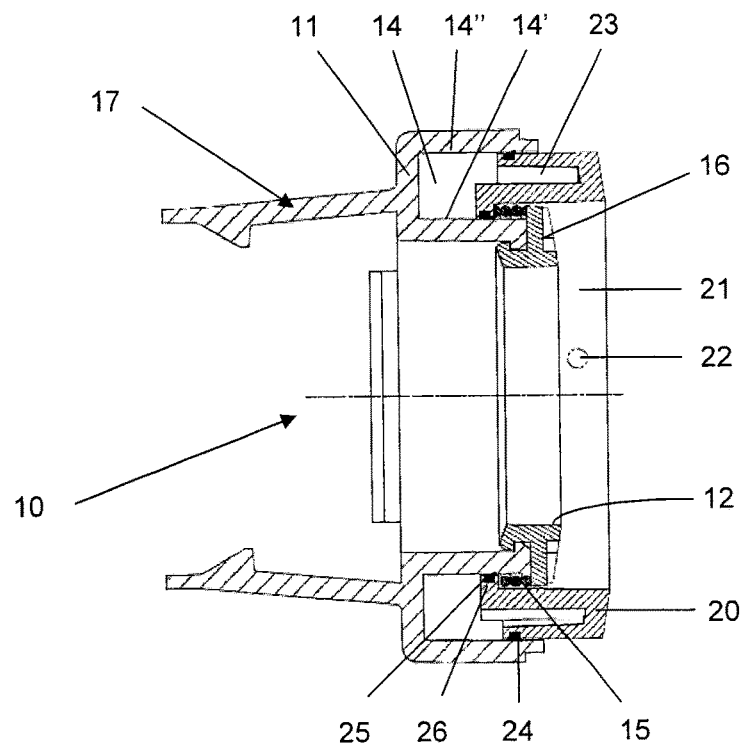
FIGS. 3 and 4 show a cross-sectional view of the preferred embodiment of the cleaning device depicted in FIGS. 1 and 2, respectively. The optic sensor has been omitted for clarity sake.
Figure 4:
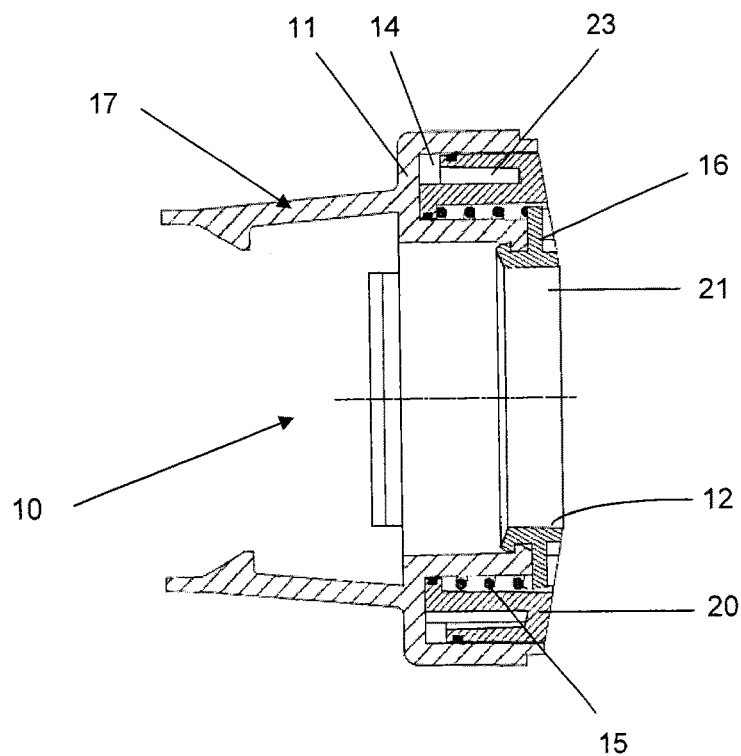

A first passage 23 is provided in the protruding part 20 and a second passage 14 is provided in the housing 11 as shown in FIGS. 3 and 4. The second passage 14 is in fluidic communication with a fluid inlet 13 provided in the housing 11 and with the first passage 23, the latter also being in fluidic communication with the at least one fluid discharge port 22.

Moreover, the first and second passages 23, 14 are arranged so as to define a variable volume chamber therebetween such that in the retracted position the variable volume chamber defines a first volume and in the extended position the variable volume chamber defines a second volume, the first volume being less than the second volume. In other words, the variable volume chamber expands its volume from the retracted position to the extended position.

A biasing mean configured to bias the protruding part 20 towards the retracted position is further provided. The biasing mean is arranged such that it prevents movement of the protruding part 20 from the retracted position to the extended position until the pressure of the washer fluid within the first passage 23 surpasses a predefined threshold level. Therefore, the biasing mean prevents expansion of the variable volume chamber until the pressure of the washer fluid within the variable volume chamber surpasses a predefined threshold level.

In this example, the biasing mean is a spring 15 having a first end in abutment with an inner protrusion 26 of the protruding part 20 and a second end in abutment with an abutment portion of the housing 11. In this example the abutment portion of the housing 11 is an abutment mean 16 snap-fitted to the housing 11.

Alternatively, the abutment mean 16 could be integrally formed with the housing 11, fixedly coupled to the housing 11 or detachably coupled to the housing 11 by any known means.

Figure 5:
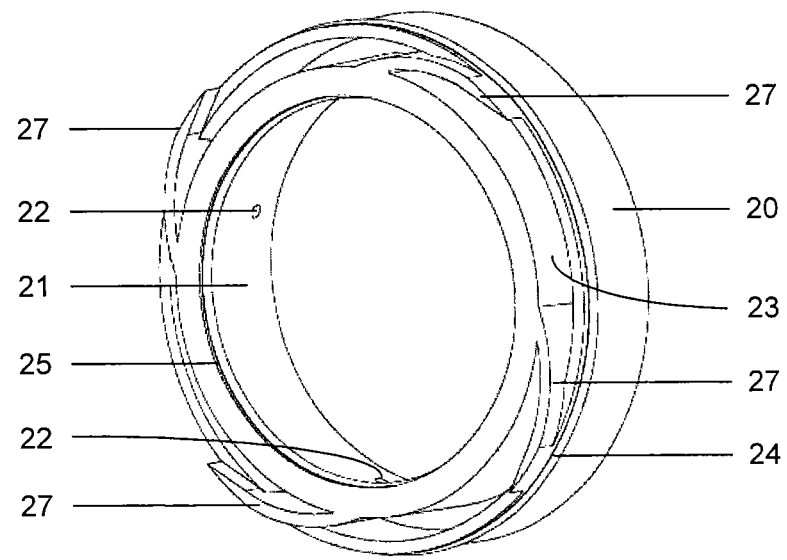
FIG. 5 shows an isometric view of the protruding part of the cleaning device isolated from the cleaning device.

A plurality of blades 27 is provided in the protruding part 20, preferably in the first passage 23, as depicted in FIG. 5. The plurality of blades 27 is arranged to cooperate with the washer fluid to rotate the protruding part 20 around the opening 12.

The second passage 14 is adapted to guide both the rotation of the protruding part 20 around the opening 12 and the displacement of the protruding part 20 between the extended and retracted positions as will be explained in the forthcoming description.

Optionally, a guiding mean (not shown) arranged to guide simultaneous displacement and rotation of the protruding part 20 is provided. In other words, the guiding mean is adapted to cause a rotational displacement of the protruding part 20 between the retracted position and the extended position.

In this example, a helical slot is provided in the housing 11, preferably in the second passage 14, and a helical protrusion is provided in the protruding part 20. The helical slot and the helical protrusion are adapted to cooperate with each other so as to guide simultaneous displacement and rotation of the protruding part 20. Alternatively, the helical slot is provided in the protruding part 20 and the helical protrusion is provided in the housing 11.

In another possible configuration of the guiding mean, first and second helical protrusions are provided in the housing 11 and the protruding part 20. The first and second helical protrusions are adapted to cooperate with each other so as to guide simultaneous displacement and rotation of the protruding part 20.

Therefore, the combination of the guiding mean and the biasing mean allows the biasing mean also to prevent rotation of the protruding part 20 until the pressure of the washer fluid within the first passage 23 surpasses a predefined threshold level.

As depicted in FIGS. 3 and 4, the protruding part 20 is at least partially housed in the second passage 14 in the extended position (see FIG. 3) and substantially housed in the second passage 14 in the retracted position (see FIG. 4) such that the protruding part 20 is hidden within the second passage 14 in this retracted position.

The second passage 14 has therefore two passage walls, an inner passage wall 14' and an outer passage wall 14", in contact with the protruding part 20 so as to guide rotation and displacement of the protruding part 20.

Preferably, first and second sealing gaskets 24, 25 are provided in the protruding part 20 for providing a watertight contact between the protruding part 20 and the inner and outer passage walls 14', 14". The first and second sealing gaskets 24, 25 are advantageously overmolded in a suitable sealing material.

Optionally, a stopper mean (not shown) is provided. This stopper mean is configured to limit rotation of the protruding part 20 around the opening 12 to a predefined angle around the opening 12.

This configuration allows a two-phase cleaning, a first phase where washer fluid discharge is combined with rotation of the protruding part 20 to remove strongly adhered foreign matter and a second phase where only washer fluid is discharged to wash away the removed foreign matter.

Optionally, the first cleaning phase ends before the protruding part 20 has reached the extended position. In other words, rotation of the protruding part 20 is interrupted during movement of the protruding part 20 from the retracted position to the extended position whilst extension of the protruding part 20 continues until the extended position is reached.

Figure 6:
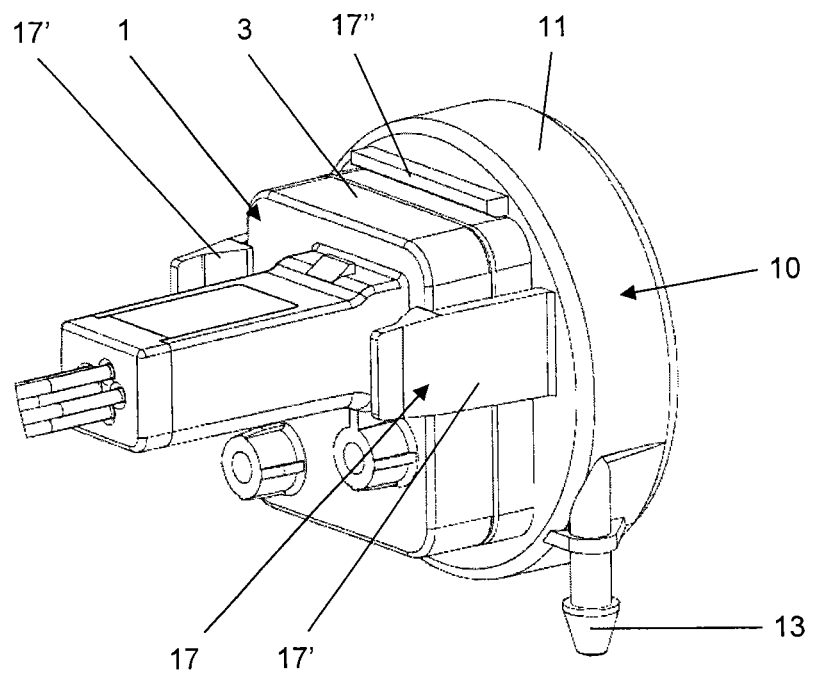
FIG. 6 shows an isometric view of a preferred embodiment of an attachment mean of the cleaning device for attachment of the cleaning device to an optic surface.

As best appreciated in FIG. 6, a snap-fitting mean 17 is provided in the housing 11.

The snap-fitting mean 17 is adapted to snap-fit the cleaning device 10 to the optic sensor housing 3.

In this example the snap-fitting mean 17 consists of a pair of attachment clips 17' and a positioning protrusion 17" that aids correct positioning of the cleaning device 10 with respect to the optic sensor 1 and avoids relative rotation of the cleaning device 10 and the optic sensor housing 3.

According to a second aspect of the invention, a cleaning system for a vehicle-mounted optic surface is provided. The cleaning system comprises a washer fluid feeding mean to supply washer fluid to a fluid inlet of a cleaning device for cleaning an optic surface. The washer fluid feeding mean comprises a washer fluid reservoir, a pump and washer fluid conduits connecting the washer fluid reservoir, the pump and the cleaning device therebetween.

As a vehicle user activates the cleaning system, a control unit implemented by means of a programmable electronic device, electrically communicated with the pump, is adapted or programmed to carry out a cleaning cycle, in which the pump is activated to pump washer fluid from a washer fluid reservoir to the washer fluid conduit generating a flow of washer fluid which is introduced into the cleaning device 10 through the fluid inlet 13.

The washer fluid flow enters the cleaning device 10 through the fluid inlet 13 and is guided through the second passage 14 to the first passage 23. This washer fluid flow impinges at least one of the plurality of blades 27, causing rotation of the protruding part 20 within the second passage 14.

Washer fluid is not yet discharged onto the optic surface 2 through the at least one fluid discharge port 22 as the protruding part 20 is still housed within the second passage 14. Therefore, the protruding part 20 has started to rotate within the second passage 14 but has not yet initiated displacement from the retracted position to the extended position due to the spring 15 that biases the protruding part 20 towards the retracted position.

As more washer fluid flow is fed into the cleaning device 10, the pressure of the washer fluid within the first passage 23 increases until it reaches a predefined threshold level that overcomes the elastic force of the spring 15, thus initiating displacement of the protruding part 20. From this instant on and until the protruding part 20 reaches the extended position, the protruding part 20 undergoes a combined movement of rotation and displacement. The washer fluid starts being discharged through the at least one discharge port 22 onto the optic surface 2 once the at least one fluid discharge port 22 protrudes from the housing 11.

Washer fluid flow is not interrupted when the protruding part 20 has reached the extended position. Therefore, the protruding part 20 keeps rotating around the opening 12.

The pump is deactivated at the end of the cleaning cycle, thus interrupting washer fluid flow. As a consequence, first, rotation of the protruding part 20 is gradually stopped as washer fluid flow slows down within the first passage 23 and, second, the pressure of the washer fluid within the first passage 23 decreases until it falls below the predefined threshold level. At this moment, the spring 15 urges the protruding part 20 back to the retracted position, hiding the protruding part 20 in the housing 11.

As the protruding part 20 is concealed within the housing 11, the quantity of washer fluid retained by the inner wall 21 of the protruding part 20 in the extended position is released.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

Reference signs related to drawings and placed in parentheses in a claim, are solely for attempting to increase the intelligibility of the claim, and shall not be construed as limiting the scope of the claim.

The invention claimed is:

1. A cleaning device for cleaning a vehicle-mounted optic surface, comprising:
    a housing, the housing comprising:
        an opening within the housing, the opening being adapted to fit an optic surface, and
        a fluid inlet arranged to take in washer fluid,
    an at least one fluid discharge port arranged to discharge the washer fluid onto the optic surface;
    a first passage in fluidic communication with the fluid inlet and the at least one fluid discharge port so as to guide the washer fluid from the fluid inlet towards the at least one fluid discharge port; and
    a protruding part provided in the housing such that the protruding part surrounds the opening, the protruding part including an inner wall around the opening and an outer wall positioned outside of the inner wall, the first passage extending between the inner wall and the outer wall,
    wherein the at least one fluid discharge port is provided in the inner wall of the protruding part and the protruding part is configured to move relative to the opening from an extended position in which the inner wall surrounds the opening to a retracted position in which the protruding part is hidden inside of the housing,
    wherein the inner wall is intersected by a plane defined by the optic surface to surround the opening when the protruding part is in the extended position such that the inner wall of the protruding part is configured to retain a quantity of the washer fluid,
    wherein the housing further comprises a second passage in fluidic communication with the fluid inlet and the first passage so as to guide the washer fluid therethrough, and
    wherein the first passage and the second passage are arranged so as to define a variable volume chamber therebetween such that in the retracted position the variable volume chamber defines a first volume and in the extended position the variable volume chamber defines a second volume, the first volume being less than the second volume.

2. The cleaning device according to claim 1, wherein the protruding part is rotatable around the opening.

3. The cleaning device according to claim 2, wherein the first passage is adapted to cooperate with the washer fluid to rotate the protruding part around the opening.

4. The cleaning device according to claim 2, wherein the protruding part further comprises a plurality of blades arranged to cooperate with the washer fluid to rotate the protruding part around the opening.

5. The cleaning device according to claim 2, wherein the first passage is provided in the protruding part, wherein the housing further comprises a second passage in fluidic communication with the fluid inlet and the first passage so as to guide the washer fluid therethrough and wherein the second passage is adapted to guide the rotary movement of the protruding part.

6. The cleaning device according to claim 2, wherein the first passage is provided in the protruding part, wherein the housing further comprises a second passage in fluidic communication with the fluid inlet and the first passage so as to guide the washer fluid therethrough and wherein the second passage is adapted to guide the movement of the protruding part between the retracted position and the extended position.

7. The cleaning device according to claim 1, wherein the protruding part is configured to move between the retracted position and the extended position, such that in the retracted position the protruding part is hidden inside the housing.

8. The cleaning device according to claim 7, further comprising a biasing means configured to bias the protruding part towards the retracted position and arranged such that the biasing means prevents movement of the protruding part from the retracted position to the extended position until the pressure of the washer fluid within the first passage surpasses a predefined threshold level.

9. The cleaning device according to claim 8, wherein the biasing means comprises a spring having a first end in abutment with a portion of the protruding part and a second end in abutment with an abutment portion of the housing.

10. The cleaning device according to claim 9, wherein the abutment portion of the housing is an abutment means integrally formed with the housing, fixedly coupled to the housing or detachably coupled to the housing.

11. The cleaning device according to claim 1, wherein the housing further comprises an attachment means adapted to detachably attach the cleaning device to the optic surface.

12. The cleaning device according to claim 1, wherein the protruding part includes an interruption in the inner wall.

13. The cleaning device according to claim 1, wherein the at least one fluid discharge port extends through the inner wall of the protruding part and faces inward.

14. A cleaning system for a vehicle-mounted optic surface, comprising a washer fluid feeding means to supply washer fluid to a fluid inlet of a cleaning device as claimed in claim 1, for cleaning an optic surface, wherein the washer fluid feeding means comprises a washer fluid reservoir, a pump and washer fluid conduits connecting the washer fluid reservoir, the pump and the cleaning device therebetween.

15. A vehicle-mounted optic sensor, comprising an optic surface, an optic sensor housing adapted to be fitted to an exterior surface of a vehicle and a cleaning device as claimed in claim 1, for cleaning the optic surface, wherein the cleaning device is fitted to the optic sensor housing.

16. A vehicle-mounted optic sensor, comprising:
an optic surface,
an optic sensor housing adapted to be fitted to an exterior surface of a vehicle, the optic sensor housing including an opening adapted to fit the optic surface; and
a cleaning device for cleaning the optic surface, the cleaning device comprising:
 a fluid inlet arranged to take in washer fluid,
 an at least one fluid discharge port arranged to discharge the washer fluid onto the optic surface,
 a first passage in fluidic communication with the fluid inlet and the at least one fluid discharge port so as to guide the washer fluid from the fluid inlet towards the at least one fluid discharge port,
 a cleaning device housing, and
 a protruding part provided in the cleaning device housing such that the protruding part surrounds the opening, the protruding part including an inner wall around the opening and an outer wall positioned outside of the inner wall, the first passage extending between the inner wall and the outer wall,
wherein the at least one fluid discharge port is provided in the inner wall of the protruding part and the protruding part is configured to move relative to the opening from an extended position in which the protruding part extends out of the cleaning device housing to a retracted position in which the protruding part is inside of the cleaning device housing,
wherein the inner wall is intersected by a plane defined by the optic surface to surround the opening when the protruding part is in the extended position such that the inner wall of the protruding part is configured to retain a quantity of the washer fluid,
wherein the cleaning device is fitted together with the optic sensor housing,
wherein the cleaning device housing further comprises a second passage in fluidic communication with the fluid inlet and the first passage so as to guide the washer fluid therethrough, and
wherein the first passage and the second passage are arranged so as to define a variable volume chamber therebetween such that in the retracted position the variable volume chamber defines a first volume and in the extended position the variable volume chamber defines a second volume, the first volume being less than the second volume.

17. The optic sensor according to claim 16, wherein the protruding part includes an interruption in the inner wall.

* * * * *